(12) United States Patent
Saurav (10) Patent No.: US 9,740,668 B1
(45) Date of Patent: Aug. 22, 2017

(54) PLOTTING WEBPAGE LOADING SPEEDS AND ALTERING WEBPAGES AND A SERVICE BASED ON LATENCY AND PIXEL DENSITY

(71) Applicant: Amazon Technologies, Inc., Reno, NV (US)

(72) Inventor: Amit Saurav, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 491 days.

(21) Appl. No.: 13/829,803

(22) Filed: Mar. 14, 2013

(51) Int. Cl.
*G06F 17/22* (2006.01)
*G06F 17/30* (2006.01)
*G06F 11/30* (2006.01)
*G06F 17/24* (2006.01)

(52) U.S. Cl.
CPC ...... *G06F 17/2247* (2013.01); *G06F 11/3065* (2013.01); *G06F 17/24* (2013.01); *G06F 17/3089* (2013.01)

(58) Field of Classification Search
CPC .. G06F 17/2247; G06F 17/24; G06F 11/3065; G06F 17/3089
See application file for complete search history.

(56) References Cited

U.S. PATENT DOCUMENTS

| | | | | |
|---|---|---|---|---|
| 6,243,761 B1 * | 6/2001 | Mogul et al. | | 709/246 |
| 6,912,304 B1 * | 6/2005 | Aghajan | | 382/149 |
| 7,325,077 B1 * | 1/2008 | Nguyen | | 709/246 |
| 8,768,918 B2 * | 7/2014 | Clary et al. | | 707/727 |
| 8,869,036 B1 * | 10/2014 | Deshpande et al. | | 715/736 |
| 8,880,996 B1 * | 11/2014 | Deshpande et al. | | 715/234 |
| 8,947,694 B2 * | 2/2015 | Honda et al. | | 358/1.15 |
| 2012/0259974 A1 * | 10/2012 | Gupta et al. | | 709/224 |
| 2012/0304044 A1 * | 11/2012 | Leithead et al. | | 715/205 |
| 2014/0325399 A1 * | 10/2014 | Puchta et al. | | 715/760 |
| 2015/0019715 A1 * | 1/2015 | Ronen et al. | | 709/224 |

OTHER PUBLICATIONS

Google, WebPagetest Documentation, Feb. 8 and Mar. 8, 2013, pp. 1-14.*

(Continued)

*Primary Examiner* — Cesar Paula
*Assistant Examiner* — Benjamin Norris
(74) *Attorney, Agent, or Firm* — Kilpatrick Townsend & Stockton LLP (57) ABSTRACT

Techniques for managing performance information associated with rendering electronic content may be provided. For example, electronic content may be rendered and pixel density information may be plotted on a graph for comparison and/or perceived latency detection. In some examples, electronic content may be monitored during an amount of time. Based at least in part on the monitoring, pixel density information may be collected. The pixel density information may be associated with rendering the electronic content during the amount of time. Further, in some examples, perceived latency information may be determined. The perceived latency information may correspond to the rendering of the electronic content based at least in part on the collected pixel density information.

25 Claims, 7 Drawing Sheets

(56) References Cited

OTHER PUBLICATIONS

Mathews Math Notes, NPL captured captured Apr. 16, 2012, all pages, https://web.archive.org/web/20120416002529/http://tutorial.math.lamar.edu/Classes/CalcI/AreaBetweenCurves.aspx.*

Boomerang. Datasheet [online]. Yahoo!, No Date Given [retrieved on Mar. 13, 2013]. Retrieved from the Internet: <URL: http://yahoo.github.com/boomerang/doc/>.

HtmlUnit. Datasheet [online]. Sourceforge, No Date Given [retrieved on Mar. 13, 2013]. Retrieved from the Internte: <URL: http://htmlunit.sourceforge.net/>.

Show Slow. Datasheet [online]. Github.com, No Date Given [retrieved on Mar. 13, 2013]. Retrieved from the Internet: <URL: http://www.showslow.org/Main_Page>.

Web Page Test. Datasheet [online]. Web Page Test.org, No Date Given [retrieved on Mar. 13, 2013]. Retrieved from the Internet: <URL: http://www.webpagetest.org/>.

\* cited by examiner

PLOTTING WEBPAGE LOADING SPEEDS AND ALTERING WEBPAGES AND A SERVICE BASED ON LATENCY AND PIXEL DENSITY

BACKGROUND

As web pages become more complex and dynamic, more and more users turn to them for enabling and/or consuming a multitude of different types of content, functions, features, and/or services. For example, a web page may include static content, such as an image, and/or dynamic content that may rely on other services or additional content from other locations. Thus, different web pages may be able to load on a screen, for example, at different speeds. Additionally, as more functionality is enabled, and more people look towards web pages for providing content as well as services, render latency has become more of an issue. However, some web pages may load faster with certain browser applications than with others. Additionally, relatively minor changes to the structure of a web page, changes in embedded code within the web page, and/or changes to the external services being called by the web page may impact the load times of the web page. As such, managing performance information associated with web pages or other electronic content may pose challenges to developers and/or content providers.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing electronic content performance. In some examples, electronic content may include, but is not limited to, an image, a video, a HyperText Markup Language (HTML) document (e.g., a web page), an Extensible Markup Language (XML) document, combinations of the foregoing, or the like. The electronic content may be stored on network drives (e.g., servers or other host devices) and/or may be managed locally by the computing system managing the performance information. For the sake of brevity, electronic content will be referred to hereinafter as a "web page;" however, one skilled in the art will recognize that the techniques described herein can be utilized to manage performance information associated with any electronic content. Additionally, in some examples, the performance of the web page may be a measure of the loading (also referred to as "rendering") time of the web page (e.g., with respect to time). For example, the performance information may indicate an amount of time it takes to load or render the entire (or at least a portion) of the web page within a graphical user interface (GUI) of a web browser or other browser application configured to represent electronic content, such as the web page.

In some examples, the performance information may be measured by capturing, monitoring, or otherwise managing pixel density information associated with rendering the web page. For example, as a web page is rendered in a browser, individual pixels of a screen or other presentation medium may be activated or otherwise highlighted to represent the web page itself. Pixels may be of different colors and/or sizes or they may be black and white and of uniform size. Either way, as the web page is rendered, a pixel density associated with the web page may increase until the web page is fully rendered. However, unless a web page is fully rendered by every available pixel, not all pixels will be activated. As such, pixel density may be measured as a percentage of every possible pixel on the screen. For example, if a screen includes 100 total pixels that can potentially be activated to represent a web page, and the web page only utilizes 50 pixels (e.g., based at least in part on the images and/or text included on the web page), the web page will be fully rendered with a pixel density of 50%. Thus, a user may perceive that the web page is rendered when the pixel density reaches some percentage close to 50% (e.g., 40%, 45%, etc.) even though the web page may not be fully loaded yet.

Additionally, in some examples, the pixel density of a web page load may be measured at regular intervals (e.g., every microsecond, millisecond, etc.) and recorded for analysis, comparison, etc. Additionally, in some examples, a snapshot (also referred to as an "image") may be taken of the web page load at the desired interval, or at other intervals (e.g., for every ten, twenty, fifty, etc., pixel density captures, a snapshot may be taken). In some aspects, the pixel density percentages may also be represented within a graph or chart including, but not limited to, a bar graph, a line graph, a histogram, a pie chart, etc. In this way, the perceived latency of the web page load may be visualized and/or compared with the perceived latency of other web pages. For example, a developer may wish to make changes to a web page and then compare the perceived latency of the modified web page with that of the original web page. Minor style, format, and/or content changes may, thus, be tested with relation to one another to determine which versions perform better.

Additionally, anomalies may be detected during the load of a web page that may indicate some issue with the web page, content served by others included in the web page, and/or underlying services (e.g., services on which the web page may depend). For example, a web page may include a reference to content from a service provider (including, but not limited to, a recommendation engine, a personalization engine, an item availability engine, a pricing engine, a content tag engine, or the like), and an anomaly detected during the load of the web page may indicate an issue with one of these services. Further, in some examples, a range of acceptable perceived load times (e.g., a maximum and/or minimum) may be determined or otherwise predicted, and web page loads that fall outside this range may be flagged as or otherwise reported.

Further, in some examples, a web browser may be provided that is configured to enable real-time monitoring of perceived web page loads. Alternatively, or in addition, a web browser plug-in may be provided that can be executed by a web browser provided by another service provider. The web browser and/or plug-in may also be configured to report pixel density information (or other perceived load time data such as, but not limited to, data collected by using vertical fill, content tags, and/or tracking pixels techniques). The service provider may utilize this pixel density information to determine when perceived load times are within acceptable ranges. When perceived load times fall outside acceptable limits, automatic modifications may be made to the web page so that subsequent requests for that web page, by the provided web browser, may be fulfilled by the modified web page. Alternatively, a service ticket (or other notification) may be generated to notify one or more other services that an issue has been detected with the web page and/or an underlying service or content. In some examples, a table or other data structure may be updated such that similar web browsers and/or client devices may be given the modified web page proactively going forward.

Figure 1:
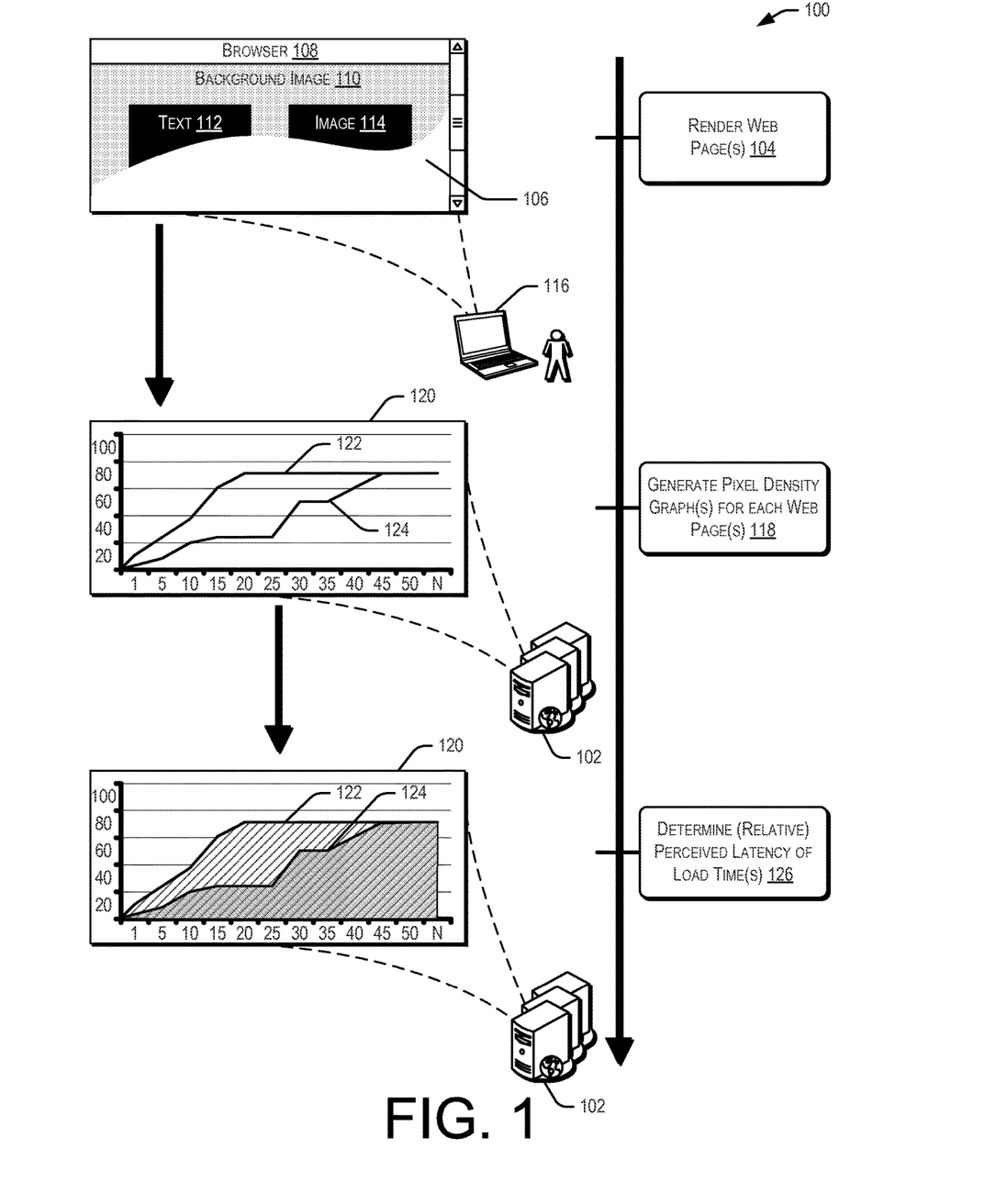
FIG. 1 illustrates an example flow for describing the management of electronic content performance described herein, according to at least one example.

FIG. 1 depicts an illustrative flow 100 with which techniques for managing electronic content performance may be described. In illustrative flow 100, operations may be performed by one or more processors of one or more content performance management computers 102. Additionally, instructions for performing the operations may be stored in one or more memories of the content performance management computers 102. As desired, the flow 100 may begin at 104, where the content performance management computers 102 may begin to render or otherwise load one or more web pages 106 (e.g., in a GUI of a web browser 108). In some examples, the browser 108 may be integrated or otherwise executed by the content performance management computers 102 such that the content performance management computers 102 are performing the rendering at 104. However, in other examples, the web page 106 may be provided to (e.g., by the content performance management computers 102) or otherwise rendered by a browser of a client computing device 116 (e.g., a user device).

In one non-limiting example, the web page 106 may include at least a background image 110, text 112 (e.g., in a text box or placed on the background image 110), and/or one or more images 114 (e.g., with a border or placed on the background image 110). The web page 106 may be rendered one pixel at a time, from any direction or in any order. However, as illustrated in FIG. 1, the web page 106 may also be rendered from the top down. In this way, portions of the top of the background image 110, the text 112, and/or image 114 may be rendered prior to the bottom portions. As such, it may be apparent, that any given point in time, a different percentage of all the pixels may be activated, with the number of activated pixels and, thus, the percentage increasing over time until the entire web page 106 is fully rendered. However, as noted above, it may often be the case that a 100% pixel density is never reached because the fully rendered web page 106 may not utilize 100% of the pixels available on the screen (or available to be activated by the browser 108).

Additionally, in some examples, the content performance management computers 102 may generate one or more pixel density graphs 120 for each web page 106, at 118. In one non-limiting example, the pixel density graph 120 may include a first representation 122 of pixel density percentages per unit of time (e.g., 1–N microseconds, milliseconds, etc.) for a first web page (e.g., the web page 106) and a second representation 124 of pixel density percentages per unit of time for a second web page (e.g., a modified version of the web page 106). As noted above, the x-axis of the pixel density graph 120 may include units of time. Additionally, the y-axis of the pixel density graph 120 may include percentages of total pixels rendered. Thus, at time t0, it would make sense that both representations 122, 124 would be at 0% since none of each page has been rendered yet. Additionally, in this example, the web page 106 (and the modified web page) may only utilize approximately 75% of the possible pixels. As such, both representations 122, 124 illustrate a straight line to time tN (indicating that the page is fully rendered from that point on).

In this example, by analyzing the two representations 122, 124, the content performance management computers 102 may determine a relative perceived latency of load times at 126. For example, it may be determined that the perceived latency for the first web page 106 may be lower than that of the modified web page based at least in part on the fact that the representation 122 appears to reach the 75% (or fully rendered) state before the second representation 124. Lower perceived latency may correlate to a perception of faster loading. For example, the first representation 122 may be fully rendered on the screen at roughly t20, while the second representation may not appear to reach 75% until roughly t45. Thus the web page 106 may appear to load faster than the modified web page. However, in some examples, a user may actually perceive that the web page 106 is rendered at some time prior to 75% pixel density (e.g., 100% rendered). For example, the web page 106 may appear to fully rendered at about 40%, in one example, based at least in part on the makeup, content, and/or focus of the web page 106 (i.e., the main part of the web page 106 that a user is interested in may be fully rendered prior to the entire page being fully rendered—this may lead to a perception of lower latency even if the page is still loading). Still, the representation 122, in this example, may still appear to load faster as evidenced by the fact that it reaches 40% pixel density near t10, while the modified page doesn't reach 40% until near t25. Of course, one of ordinary skill in the art will understand that this is but one example, and that a first representation may rise faster earlier in the time line and still be perceived to have higher latency (i.e., a slower perceived load time). In at least one example, the content performance management computers 102 may automatically determine a relative perceived latency by measuring the area under each representation 122, 124. The representation 122, 124 with the great area may be determined to have the lower perceived latency. Additionally, a metric may be calculated to rank, rate, or otherwise identify differences between relative perceived latencies by subtracting the area of one representation (e.g., 122) from another (e.g., 124). In this way, if a third area existed in the graph 120 (e.g., from a third web page), the content performance management computers 102 may be able to determine how much faster the first web page 106 appears to load with relation to the differential that may exist between the perceived latencies of the modified web page and third web page, respectively.

Figure 2:
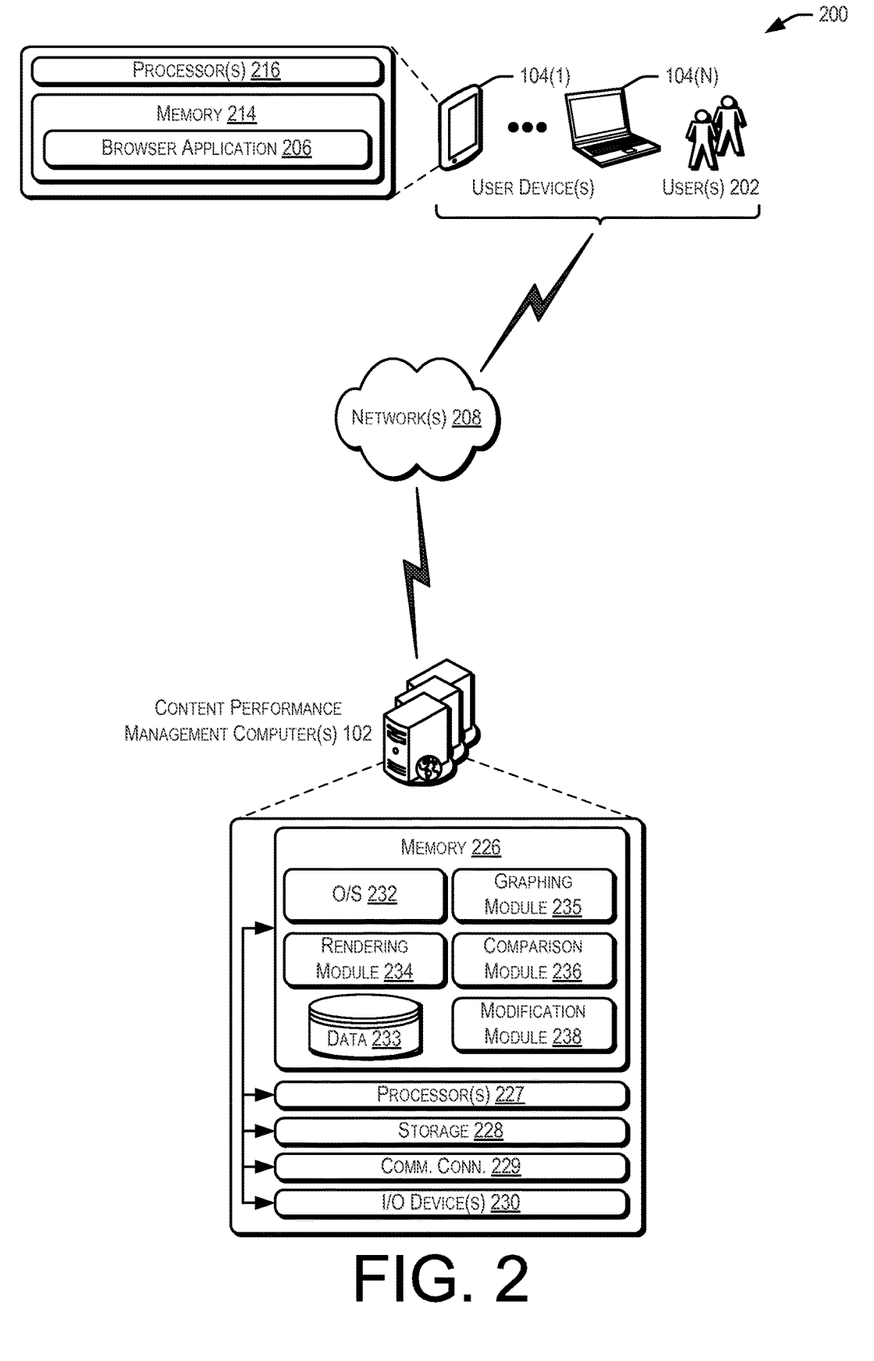
FIG. 2 illustrates an example architecture for implementing the management of electronic content performance described herein that includes one or more service provider computers and/or a user device connected via one or more networks, according to at least one example.

FIG. 2 depicts an illustrative system or architecture 200 in which techniques for managing electronic content performance may be implemented. In architecture 200, one or more users 202 (i.e., account holders or web browser users) may utilize user computing devices 204(1)-(N) (collectively, user devices 204) to access an application 206 (e.g., a web browser), a user account accessible through the application 206, or a perceived latency UI accessible through the application 206, via one or more networks 208. In some aspects, the application 206 and/or user account may be hosted, managed, and/or provided by a computing resources service or service provider, such as by utilizing one or more service provider computers and/or one or more content performance management computers 102. The one or more content performance management computers 102 may, in some examples, provide computing resources such as, but not limited to, client entities, low latency data storage, durable data storage, data access, management, virtualization, cloud-based software solutions, electronic content performance management, etc. The one or more content performance management computers 102 may also be operable to provide web hosting, computer application development, and/or implementation platforms, combinations of the foregoing, or the like to the one or more users 202. The one or more content performance management computers 102, in some examples, may provide electronic content performance management including, but not limited to, determining and/or providing perceived (e.g., relative) latency of web page rendering. Additionally, in some examples, the content performance management computers 102 may also provide modified web page content to the browser application 206 based at least in part on higher than expected or lower than requested page load latencies.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the content performance management computers 102 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.) and/or performance information (e.g., pixel densities or the like). The one or more content performance management computers 102, perhaps arranged in a cluster of servers or as a server farm, may host the application 206 and/or cloud-based software services. Other server architectures may also be used to host the application 206 and/or cloud-based software services. The application 206 may be capable of handling requests from many users 202 and serving, in response, various user interfaces that can be rendered at the user devices 204 such as, but not limited to perceived latency UI (e.g., utilizing the one or more graphs 120 described above), or the like. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the content performance management computers 102 via the networks 208, or via other network connections. Additionally, the user devices 204 may be part of the distributed system managed by, controlled by, or otherwise part of the content performance management computers 102 (e.g., a console device integrated with the content performance management computers 102).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least the perceived latency UI, such as via the web browsers 206 or dedicated applications (e.g., smart phone applications, tablet applications, etc.). The web browser 206 may be configured to receive, store, and/or display a website or other interface for interacting with the content performance management computers 102. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

Additionally, in some aspects, the content performance UI (which may be, e.g., part of the web browser application 206) may allow a user 202 to interact with the content performance management computers 102. As such, the content performance UI may be utilized by the user 202 to enter or otherwise provide one or more URLs for accessing web pages. Additionally, the content performance UI may also allow a user 202 to review or otherwise consume the pixel density graphs 120 described above with reference to FIG. 1.

In some aspects, the content performance management computers 102 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the content performance management computers 102 may be in communication with the user devices 204 and/or other service providers via the networks 208, or via other network connections. The content performance management computers 102 may include one or more servers, perhaps arranged in a cluster, as a server farm, or as individual servers not associated with one another. These servers may be configured to implement the content performance management described herein as part of an integrated, distributed computing environment.

In one illustrative configuration, the content performance management computers 102 may include at least one memory 226 and one or more processing units (or processor(s)) 227. The processor(s) 227 may be implemented as appropriate in hardware, computer-executable instructions, firmware, or combinations thereof. Computer-executable instruction or firmware implementations of the processor(s) 227 may include computer-executable or machine-executable instructions written in any suitable programming language to perform the various functions described.

The memory 226 may store program instructions that are loadable and executable on the processor(s) 227, as well as data generated during the execution of these programs. Depending on the configuration and type of content performance management computers 102, the memory 226 may be volatile (such as RAM) and/or non-volatile (such as ROM, flash memory, etc.). The content performance management computers 102 or servers may also include additional storage 228, which may include removable storage and/or non-removable storage. The additional storage 228 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 226 may include multiple different types of memory, such as SRAM, DRAM, or ROM.

The memory 226, the additional storage 228, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 226 and the additional storage 228 are all examples of computer storage media. Additional types of computer storage media that may be present in the content performance management computers 102 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the content performance management computers 102. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The content performance management computers 102 may also contain communications connection(s) 229 that allow the content performance management computers 102 to communicate with a stored database, another computing device or server, user terminals and/or other devices on the networks 208. The content performance management computers 102 may also include I/O device(s) 230, such as a keyboard, a mouse, a pen, a voice input device, a touch input device, a display, speakers, a printer, etc.

Turning to the contents of the memory 226 in more detail, the memory 226 may include an operating system 232, one or more data stores 233, and/or one or more application programs or services for implementing the features disclosed herein including a rendering module 234, a graphing module 235, a comparison module 236, and/or a modification module 238. In some examples, the rendering module 234 may be configured to render or provide instructions to render the one or more web pages discussed above. For example, the rendering module 234 may be configured to simulate web page rendering for testing or other analytical processes. When a user 202 enters a URL, the rendering module 234 may be configured to request the electronic content (e.g., the web page) from a source or host identified by the URL. Additionally, the rendering module 234 may be configured to collect the pixel density information and/or generate or collect the one or more snapshots while rendering the web pages. Further, in some examples, the rendering module 234 may be configured to generate, manage, or otherwise store in the data store 233 (or other local or remote storage device) all relevant information (e.g., pixel density information, snapshot information, etc.), as desired.

In some examples, the graphing module 235 may be configured to generate and/or provide the one or more pixel density graphs 120 as described with reference to FIG. 1 and/or generate each individual representation (e.g., the collective data points plotted on the graph 120 for each web page rendering). Additionally, in some examples, the graphing module 235 may store relevant graphing data in the data stores 233. The graphing module 235 may also be configured to enable multiple different types of graphs and/or multiple different representations on a single graph 120, as desired. The comparison module 236 may be configured, in some examples, to compare one or more graphs 120 and/or one or more representations of a single graph 120. For example, if two different web pages (or two different version of the same web page) are each rendered and graphed, the comparison module 236 may be configured to compare the two in order to determine a perceived latency for each. Alternatively, or in addition, the comparison module 236 may also be configured to determine relative latencies between two representation (e.g., that a first representation indicates a faster page load than the second). Further, the comparison module 236 may be configured to provide one or more comparison tools. For example, UI elements such as guidelines or other markers may be utilized to enable visual comparison by a user 202 or other entity.

In some examples, the modification module 238 may be configured to modify one or more of the web pages based at least in part on pixel densities, graphs, and/or perceived latencies. For example, based at least in part on a determination that a first web page loads slower than a second page, the modification module 238 may be configured to further modify the web page and/or the modified web page in order to continue testing the modifications and/or the web browser 206. Additionally, in some examples, the modification module 238 may be configured to make real-time modifications to web page content in order to avoid or otherwise alleviate issues found within the page. The modification module 238 may also be configured to make modifications to underlying services (e.g., a recommendation engine, a personalization engine, etc.) in order to fix anomalous behavior and/or enhance the user experience.

Further, in some examples, the modification module 238 may generate a catalog, library, or the like of web page content modifications and corresponding known perceived latency changes. For example, based at least in part on past perceived latency determinations, the modification module 238 may learn which modifications to which web pages make what latency and/or performance changes (e.g., for which web browsers and/or user devices). In this way, the modification module 238 may be able to quickly look up a modification to affect a web page in real-time prior to providing subsequent pages once a latency issue has been detected (e.g., based at least in part on the comparison module). For example, a range of acceptable latencies may be provided and if the comparison module 236 determines that a web page is loading too slowly (based at least in part on the latency falling outside of the acceptable range), the modification module 238 may quickly look up a modification that would resolve the unacceptable latency.

A few additional examples of the operations of the electronic content performance management computers 106 are also described in greater detail below with reference to FIGS. 3-7.

Figure 3:
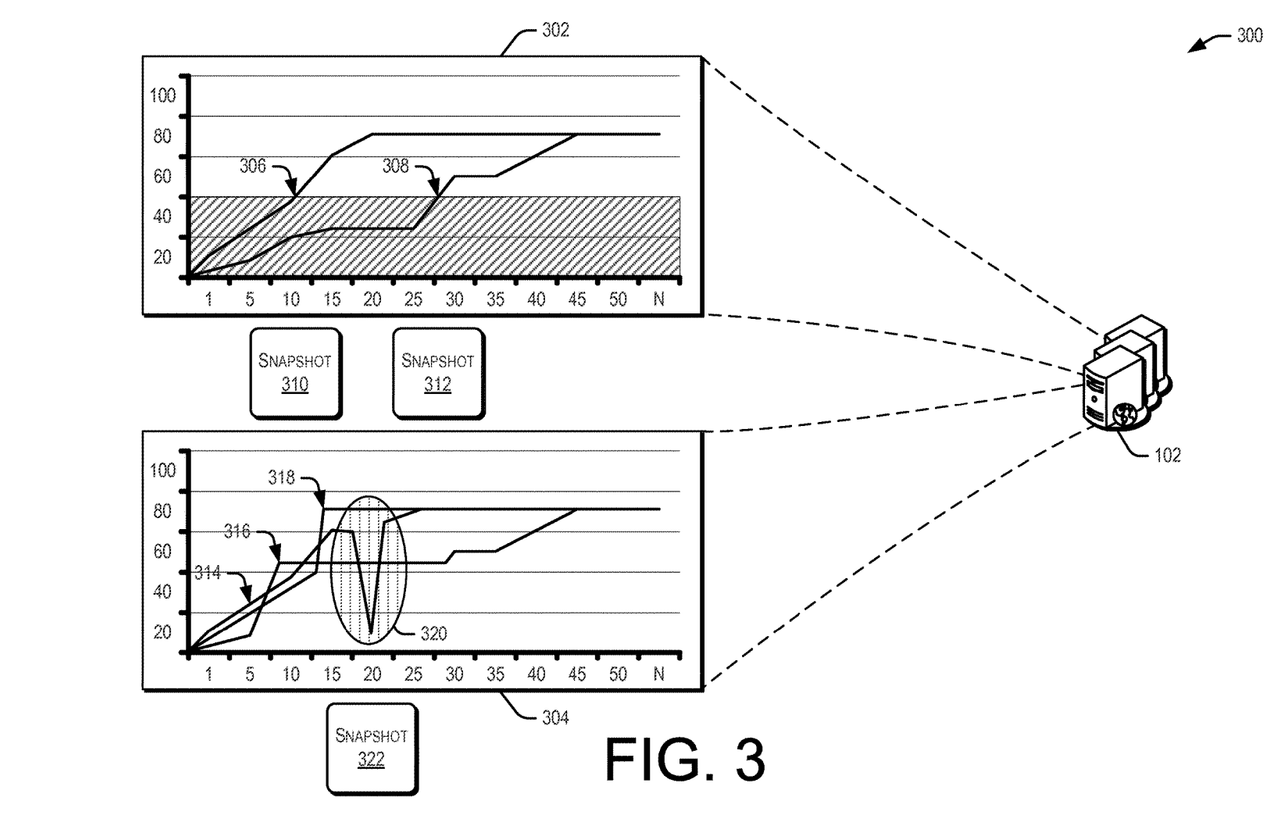
FIG. 3 illustrates an example block diagram for describing the management of electronic content performance described herein, according to at least one example.

FIG. 3 depicts an example block diagram 300, for describing additional techniques and/or features for managing electronic content performance, as described herein. In some examples, as discussed above, one or more content performance management computers 102 may be configured with a graphing module 235 and/or a comparison module 236 (as described above with reference to FIG. 2). Additionally, as noted above, the graphing module 235 may be configured to generate and/or provide several different graphs 302, 304. The different graphs 302, 304 may enable different visualizations to aid with comparing (in conjunction with the comparison module 236) different pixel density representations. For example, and without limitation, the graphing module 235 may generate the first graph 302 with two different pixel density lines (e.g., each line representing a different web page loading experiment). In this example, a threshold perceived latency level may be utilized to determine which of the two web pages has a lower latency. As illustrated in FIG. 3, the threshold may be set at 40% (however, in other examples any percentage may be used as long as the percentage is not above the fully loaded percentage for the web page—roughly 75% in this example). As such, by identifying where each pixel density line crosses the threshold, the comparison module 236 and/or a user may be able to determine which line represents the lower latency. Here, the first line crosses the threshold at 306 and the second line crosses the threshold at 308. As such, the first web page (corresponding to the first pixel density line) clearly was perceived to have loaded faster (i.e., with less latency). Additionally, in some examples, one or more snapshots may be generated throughout the rendering. For example a first snapshot 310 and/or a second snapshot 312 may have been taken when the first and second web pages, respectively, were 40% loaded. The snapshots 310, 312 may provide a visualization of what the rendering looked like at those points in time, namely about 10 units of time and 25 units of time, respectively. In some examples, the snapshots may be valuable in determine what caused one page to load slower than another.

In some examples, the graphing module 235 may also be configured to generate or provide a second pixel density graph 304. The second pixel density graph 304 may illustrate at least two different techniques for determining perceived latencies of page loads. Here, three different pixel densities are shown plotted next to each other. Again, these may all be representations of the pixel densities for different variations of the same web page, which may be evidenced by the indication that all three pixel density plots flatten out at about 75% (indicating at least they may each utilize the same number of pixels). However, the graph 304 may also illustrate that the perceived latency may change over time, depending on the plots. Here, at roughly t3, the first pixel density line 314 would appear to have the highest percentage of pixels rendered. However, as time continues (e.g., at roughly t7) the second pixel density line 316 appears to have the most pixels rendered. Further, at roughly t11, the third pixel density line 318 appears to be correspond to the first web page of the three to fully render. As such, which web page appears to load the fastest clearly depends on the point at which the web page is perceived to be fully rendered. For example, for this web page, if a user would perceive that the page is fully loaded at 20%, the first web page would appear to load the fastest. However, if the web page appears to be fully loaded at 60%, the third web page would appear to load the fastest. Additionally, if the web page appears to be fully loaded at about 30%, then the first second web pages would likely appear to load at the same speed. Thus, if the percentage at which a page appears to be fully loaded is known additional logic may be utilized to determine which modifications for the given web page may be optimal for minimizing perceived latency.

Further, in some examples, the graph 304 may also be utilized to identify anomalies within the page rendering. For example, the circle 320 identifies a point in time (e.g., roughly t17) where the web page rendering may have flashed (e.g., an empty or blank screen) for a moment. In this case, the web page may have been in the middle loading (e.g., at roughly 60% pixel density in this example) when the screen when blank and then the rendering continued where it left off. By analyzing the graph 304, the comparison module 236 and/or a user of the content performance management computers 102 may be able to identify the anomaly. Appropriate actions may be taken including, but not limited to, identifying that this web page and this browser have an incompatibility or other issue that causes the screen flash, logging this information, modifying the web page to avoid such a screen flash, and/or providing modified versions of the page to this particular browser in the future. Additionally, in some examples, the graphing module 235 may also be configured to automatically take snapshots 322 whenever anomalous behavior occurs while rendering a web page. In this example, the snapshot 322 may capture the screen flash. Thus, the cause of the screen flash may be detectable by analyzing the snapshot 322. Additionally, in some examples, a first and second (or more than two) different web pages may be rendered multiple times each, respectively. For example, the rendering may be performed repeatedly a few times (ten, hundred, thousand, etc.) for each web page. However, plotting pixel density graphs for a few hundred (or more) renders may be difficult to visualize and/or analyze. As such, in some examples, a scatter plot may be generated. In some examples, scatter plot points from the first web page may be represented as a different color than those of the second web page. Thus, differences in the perceived latency may be determined based at least in part on the scatter plot information (e.g., based at least in part on a number of points of a given web page that exist on the graph to the left of a given time, how the data points cluster, etc.).

Figure 4:
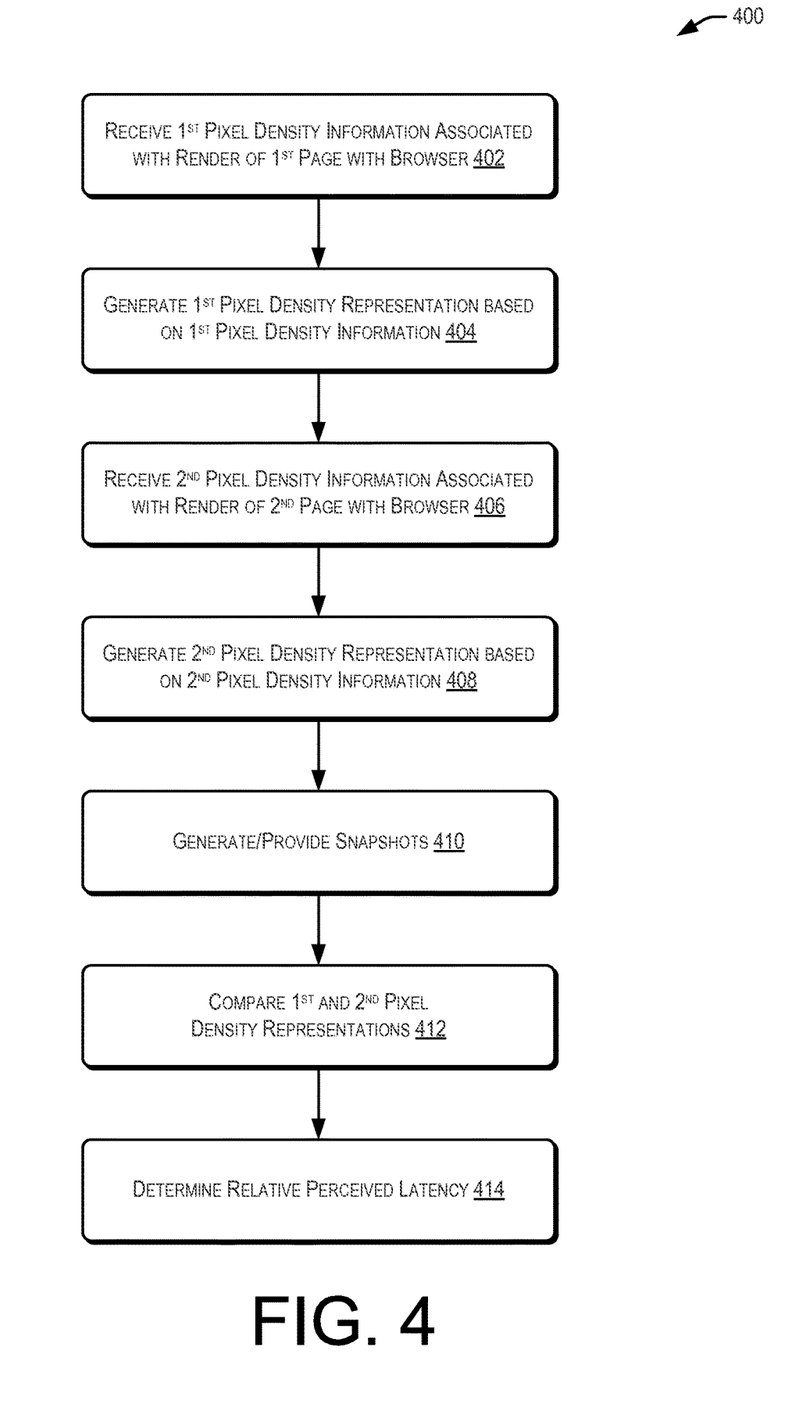
FIG. 4 illustrates an example flow diagram of a process for describing implementation of the management of electronic content performance described herein, according to at least one example.
Figure 5:
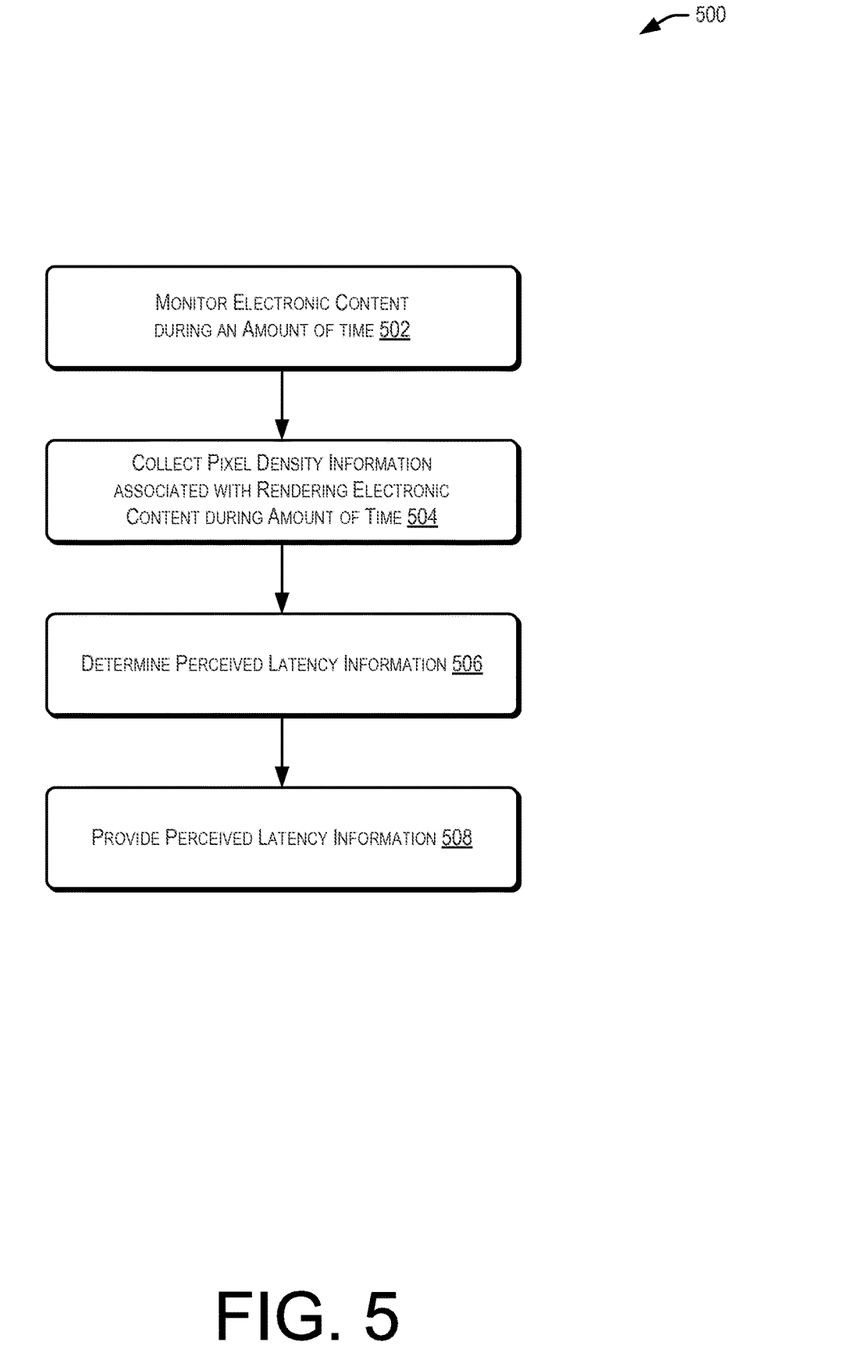
FIG. 5 illustrates an example flow diagram of a process for describing implementation of the management of electronic content performance described herein, according to at least one example.
Figure 6:
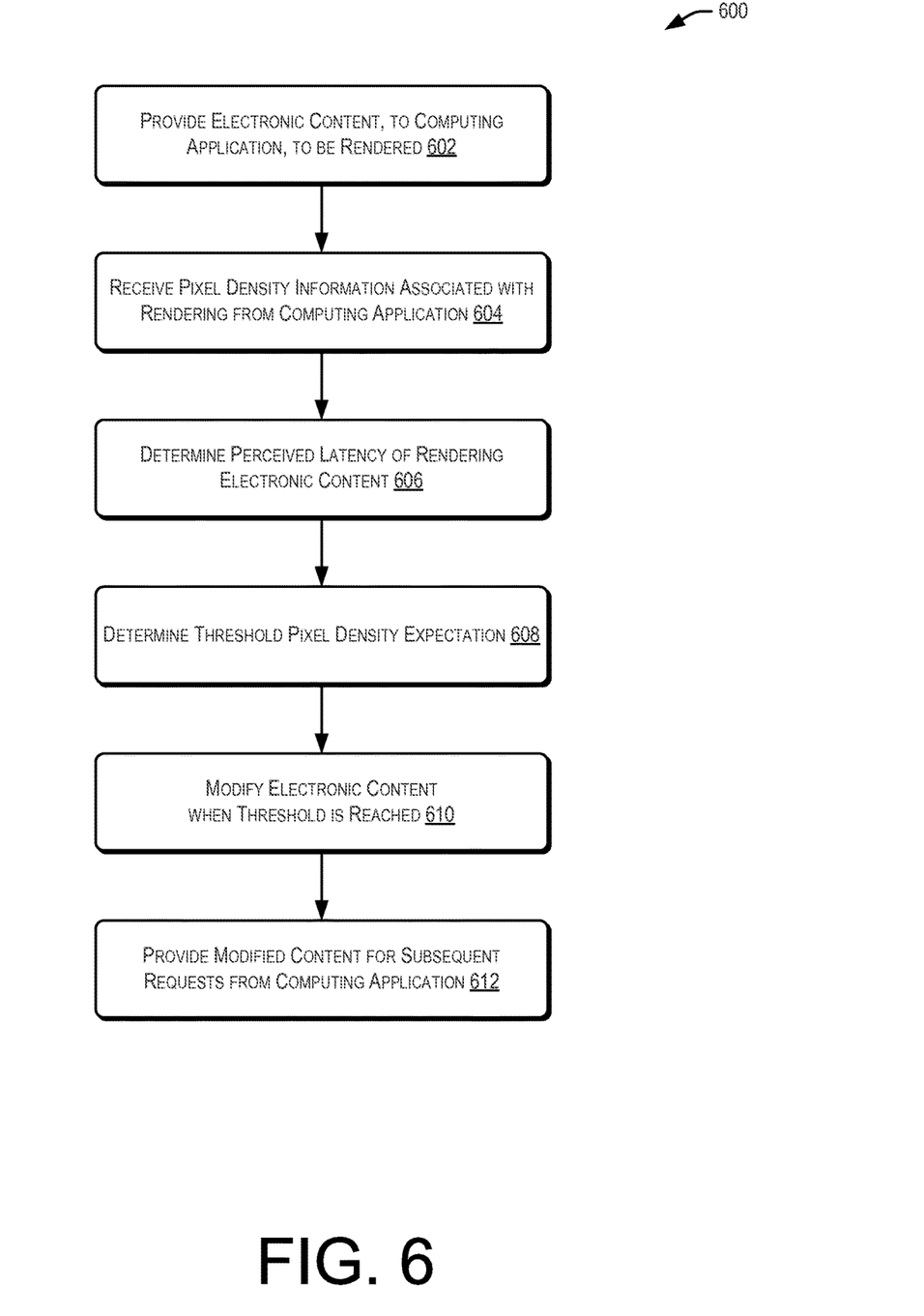
FIG. 6 illustrates an example flow diagram of a process for describing implementation of the management of electronic content performance described herein, according to at least one example.

FIGS. 4-6 illustrate example flow diagrams showing respective processes 400, 500, 600 for providing electronic content performance management, according to at least a few examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more content performance management computers 102 (e.g., utilizing at least one of the rendering module 234, the graphing module 235, the comparison module 236, and/or the modification module 238) shown in FIG. 2 may perform the process 400 of FIG. 4. The process 400 may begin at 402 by including receiving first pixel density information associated with rendering a first web page with a browser. At 404, the process 400 may include generating a first pixel density representation based at least in part on the first pixel density information. In some examples, the process 400 may also include receiving second pixel density information associated with rendering a second web page with the browser at 406. At 408, the process 400 may include generating a second pixel density representation based at least in part on the second pixel density information. The process 400 may also include generating and/or providing snapshots of the web page while rendering the web page at 410. At 412, the process 400 may include comparing the first and second pixel density representations. Further, the process 400 may end at 414, where the process 400 may include determining a relative perceived latency for loading either or both of the first or second web pages.

FIG. 5 illustrates an example flow diagram showing process 500 for providing electronic content performance management, according to at least a few examples. The one or more content performance management computers 102 (e.g., utilizing at least one of the rendering module 234, the graphing module 235, the comparison module 236, and/or the modification module 238) shown in FIG. 2 may perform the process 500 of FIG. 5. The process 500 may begin at 502 by including monitoring electronic content during an amount of time. At 504, the process 500 may include collecting pixel density information associated with rendering the electronic content during the amount of time. At 506, the process 500 may also include determining perceived latency information for loading the electronic content. Further, in some examples, the process 500 may end at 508, where the process 500 may include providing the determined perceived latency information (e.g., to a user or the like).

FIG. 6 illustrates an example flow diagram showing process 600 for providing electronic content performance management, according to at least a few examples. The one or more content performance management computers 102 (e.g., utilizing at least one of the rendering module 234, the graphing module 235, the comparison module 236, and/or the modification module 238) shown in FIG. 2 may perform the process 600 of FIG. 6. The process 600 may begin at 602 by including providing electronic content, to a computing application, to be rendered. In some cases, the computing application may be a web browser or other software of a client device. At 604, the process 600 may include receiving pixel density information associated with rendering the electronic content (e.g., a web page). The pixel density information may be received from the computing application. At 606, the process 600 may also include determining perceived latency of rendering of electronic content. At 608, the process 600 may include determining a threshold pixel density expectation. Additionally, in some examples, the process 600 may include modifying the electronic content when the threshold is reached at 610. Further, the process 600 may end at 612, where the process 600 may include providing modified content for subsequent requests from the computing application.

Illustrative methods and systems for managing electronic content performance are described above. Some or all of these systems and methods may, but need not, be implemented at least partially by architectures such as those shown at least in FIGS. 1-6 above.

Figure 7:
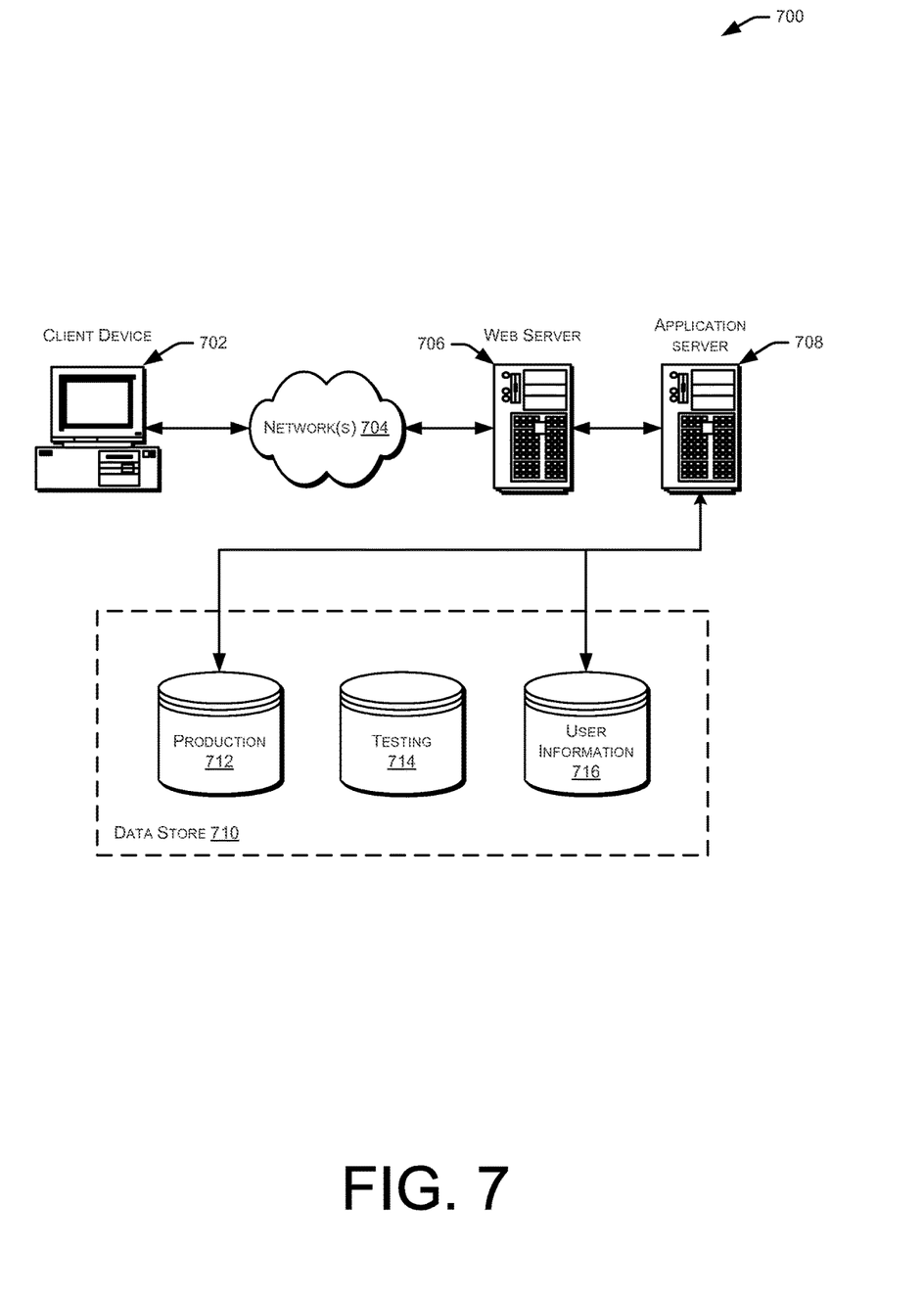
FIG. 7 illustrates an environment in which various embodiments of the management of electronic content performance described herein can be implemented, according to at least one example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Conjunctive language such as the phrase "at least one of X, Y and Z," unless specifically stated otherwise, is otherwise understood with the context as used in general to present that an item, term, etc. may be either X, Y, or Z, or a combination thereof. Thus, such conjunctive language is not generally intended to imply that certain embodiments require at least one of X, at least one of Y and at least one of Z to each is present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing electronic content rendering performance, comprising:
under control of one or more computer systems configured with executable instructions,
receiving first pixel density information associated with rendering a first electronic page with a browser application;
generating a first pixel density representation over an amount of time based at least in part on the first pixel density information;
receiving second pixel density information associated with rendering a second electronic page with the browser application;
generating a second pixel density representation over a second amount of time based at least in part on the second pixel density information;
comparing the first pixel density representation and the second pixel density representation, wherein the first pixel density representation and the second pixel density representation take into account a perceived fully-loaded pixel density level, the perceived fully-loaded pixel density level being less than an actual fully-loaded pixel density level associated with the first electronic page or with the second electronic page;
determining, based at least in part on the comparison, a relative perceived latency for the first electronic page with respect to the second electronic page;
modifying the first electronic page based at least in part on the relative perceived latency for the first electronic page and a range of pixel density levels associated with the first electronic page; and
modifying an underlying service with which the first electronic communicates based at least in part on the relative perceived latency for the first electronic page and the range of pixel density levels associated with the first electronic page.

2. The computer-implemented method of claim 1, wherein the first pixel density representation includes a first graph of the first pixel density information per unit of time of the amount of time and the second pixel density representation includes a second graph of second pixel density information per unit of time of the second amount of time.

3. The computer-implemented method of claim 2, wherein the pixel density information includes a percentage of total pixels of at least one of the first electronic page or the second electronic page rendered by the browser application.

4. The computer-implemented method of claim 3, wherein the comparison includes reviewing the first graph relative to the second graph, and wherein the relative perceived latency is based at least in part on which of the first graph or the second graph reaches a percentage of total pixels rendered earliest during at least one of the amount of time or the second amount of time.

5. The computer-implemented method of claim 1, further comprising generating a snapshot that represents an image of the first electronic page being rendered with the browser application at a point in the amount of time.

6. The computer-implemented method of claim 1, further comprising:
generating a plurality of additional pixel density representations over a plurality of respective amounts of time based at least in part on the first pixel density information;
generating a second plurality of additional pixel density representations over a second plurality of respective amounts of time based at least in part on the second pixel density information; and
generating a scatter plot associated with the plurality of additional pixel density representations and the second plurality of additional pixel density representations, wherein determining the relative perceived latency for the first electronic page with respect to the second electronic page is further based at least in part on comparing points of the scatter plot.

7. A computer-implemented method for managing electronic content rendering performance, comprising:
under control of one or more computer systems configured with executable instructions,
monitoring electronic content during an amount of time;
collecting, based at least in part on the monitoring, pixel density information associated with rendering the electronic content during the amount of time;
comparing the pixel density information with perceived fully-loaded pixel density level, the perceived fully-loaded pixel density level being less than an actual fully-loaded pixel density level associated with the electronic content;
determining perceived latency information corresponding to the rendering of the electronic content based at least in part on the comparison;
modifying the electronic content based at least in part on the perceived latency information for the rendering of the electronic content and a range of pixel density levels associated with the electronic content; and
modifying an underlying service with which the electronic content communicates based at least in part on the perceived latency for the electronic content and the range of pixel density levels associated with the electronic content.

8. The computer-implemented method of claim 7, further comprising providing the perceived latency information.

9. The computer-implemented method of claim 8, wherein the perceived latency is provided within a graphical user interface configured to render a graph representing the perceived latency over at least a subset of the amount of time.

10. The computer-implemented method of claim 9, wherein the graph represents the perceived latency with respect to the pixel density information per unit of time.

11. The computer-implemented method of claim 10, wherein the pixel density information is represented as a percentage of a total number of pixels rendered of the electronic content.

12. The computer-implemented method of claim 8, wherein the perceived latency is provided over a network to an external entity associated with the electronic content based at least in part on an application programming interface method, generated by the one or more computer systems, called by the external entity associated with the electronic content.

13. The computer-implemented method of claim 7, wherein the electronic content is at least one of accessible via a uniform resource locator, stored on a remote server, or renderable with a browser application.

14. The computer-implemented method of claim 7, wherein the amount of time is long enough to at least monitor a threshold percentage of pixels of the electronic content being rendered in a browser application.

15. The computer-implemented method of claim 7, wherein the electronic content is a first electronic page, the pixel density information is first pixel density information, and the perceived latency information is determined based at least in part on a comparison of the first pixel density information and second pixel density information associated with a second electronic page, the second electronic page including at least one of a same number of pixels as the first electronic page or a same location of pixels as the first electronic page.

16. The computer-implemented method of claim 7, wherein collecting the pixel density information includes receiving, from a browser application, at least one of a number of pixels or a percentage of pixels rendered by the browser application.

17. A system for managing electronic content rendering performance, comprising:
  a memory that stores computer-executable instructions; and
  a processor configured to access the memory, wherein the processor is configured to execute the computer-executable instructions to collectively at least:
    receive pixel density information associated with rendering electronic content with a browser;
    generate a pixel density graph based at least in part on the received pixel density information;
    identify anomalous behavior of the rendering of the electronic content based at least in part on the generated pixel density graph, the anomalous behavior including a reduction of pixel density during the rendering of the electronic content;
    modify the electronic content based at least in part on the identified anomalous behavior and a range of pixel density levels associated with the electronic content; and
    modify an underlying service with which the electronic content communicates based at least in part on the identified anomalous behavior for the electronic content and the range of pixel density levels associated with the electronic content.

18. The system of claim 17, wherein the pixel density graph enables visualization of a percentage of total pixels included in the rendering of the electronic content per unit of time out of a total amount of time included in the rendering of the electronic content.

19. The system of claim 17, wherein modifying the electronic content includes at least one of generating a message for a service provider or providing the message to the service provider.

20. The system of claim 17, wherein modifying the electronic content includes at least identifying a modified version of the electronic content for providing to the browser in response to a subsequent request, by the browser, for the electronic content.

21. One or more non-transitory computer-readable media storing computer-executable instructions for managing electronic content rendering performance that, when executed by one or more computer systems, configure the one or more computer systems to perform operations comprising:
  providing, to a computing application accessible via a network, electronic content to be rendered on the computing application;
  receiving, from the computing application, pixel density information associated with rendering the electronic content;
  comparing the pixel density information with a perceived fully-loaded pixel density level, the perceived fully-loaded pixel density level being less than an actual fully-loaded pixel density level associated with the electronic content;
  determining, based at least in part on the comparison, a perceived latency of rendering the electronic content;
  modifying the electronic content based at least in part on the perceived latency of the rendered electronic content and a range of pixel density levels associated with the electronic content; and
  modifying an underlying service with which the electronic content communicates based at least in part on the perceived latency of the rendered electronic content and the range of pixel density levels associated with the electronic content.

22. The one or more non-transitory computer-readable media of claim 21, wherein the instructions further configure the one or more computer systems to perform operations comprising determining a threshold pixel density per unit time that is expected for rendering the electronic content on the computing application.

23. The one or more non-transitory computer-readable media of claim 22, wherein the instructions further configure the one or more computer systems to perform operations comprising modifying the electronic content when the threshold pixel density per unit time is reached.

24. The one or more non-transitory computer-readable media of claim 23, wherein the instructions further configure the one or more computer systems to perform operations comprising providing the modified electronic content to the computing application at least in response to a subsequent request, from the computing application, for the electronic content.

25. The computer-implemented method of claim 1, wherein comparing the first pixel density representation and the second pixel density representation comprises subtracting a first area of the pixel density representation from a second area of the second pixel density representation.

* * * * *